Dec. 30, 1924.

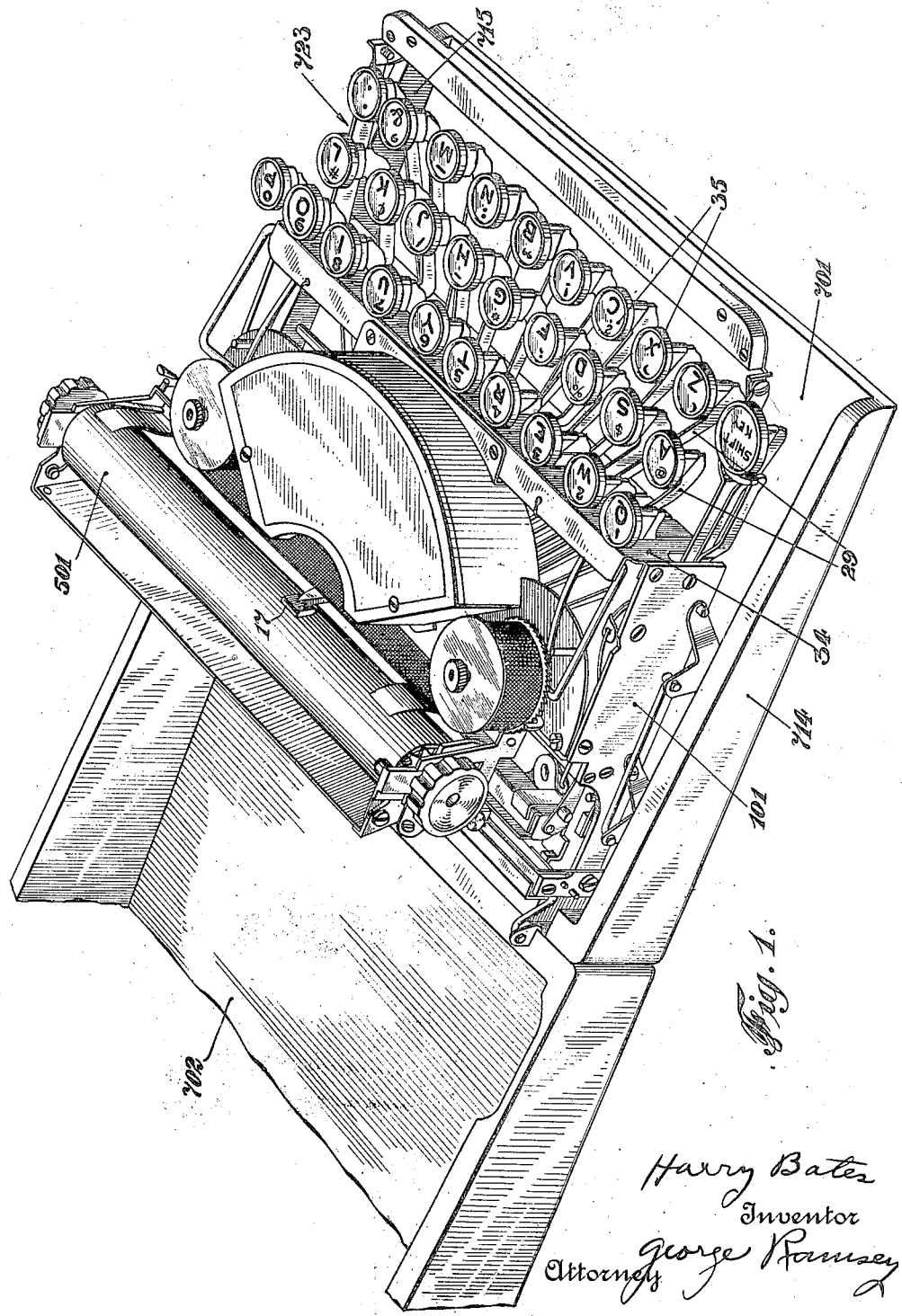

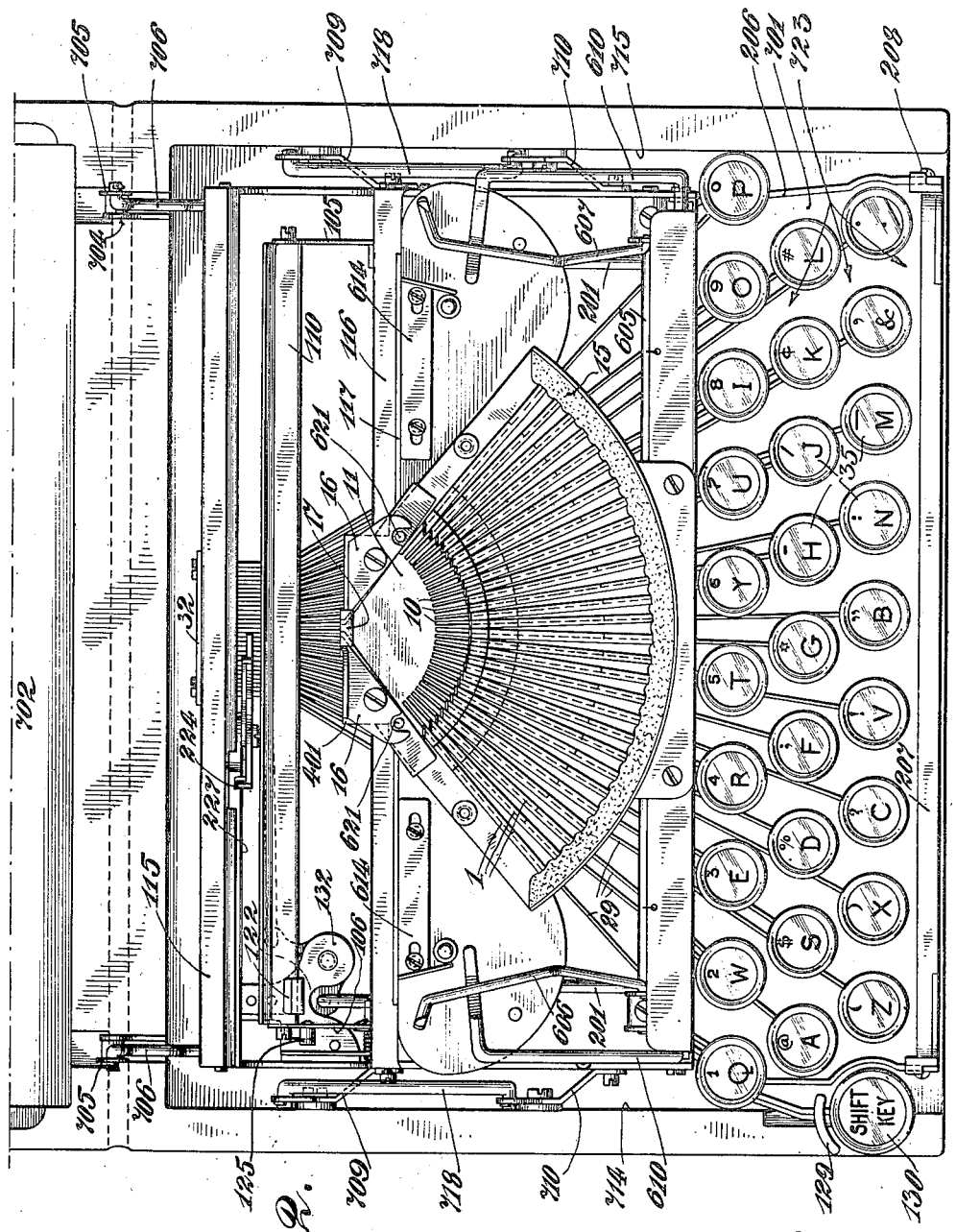

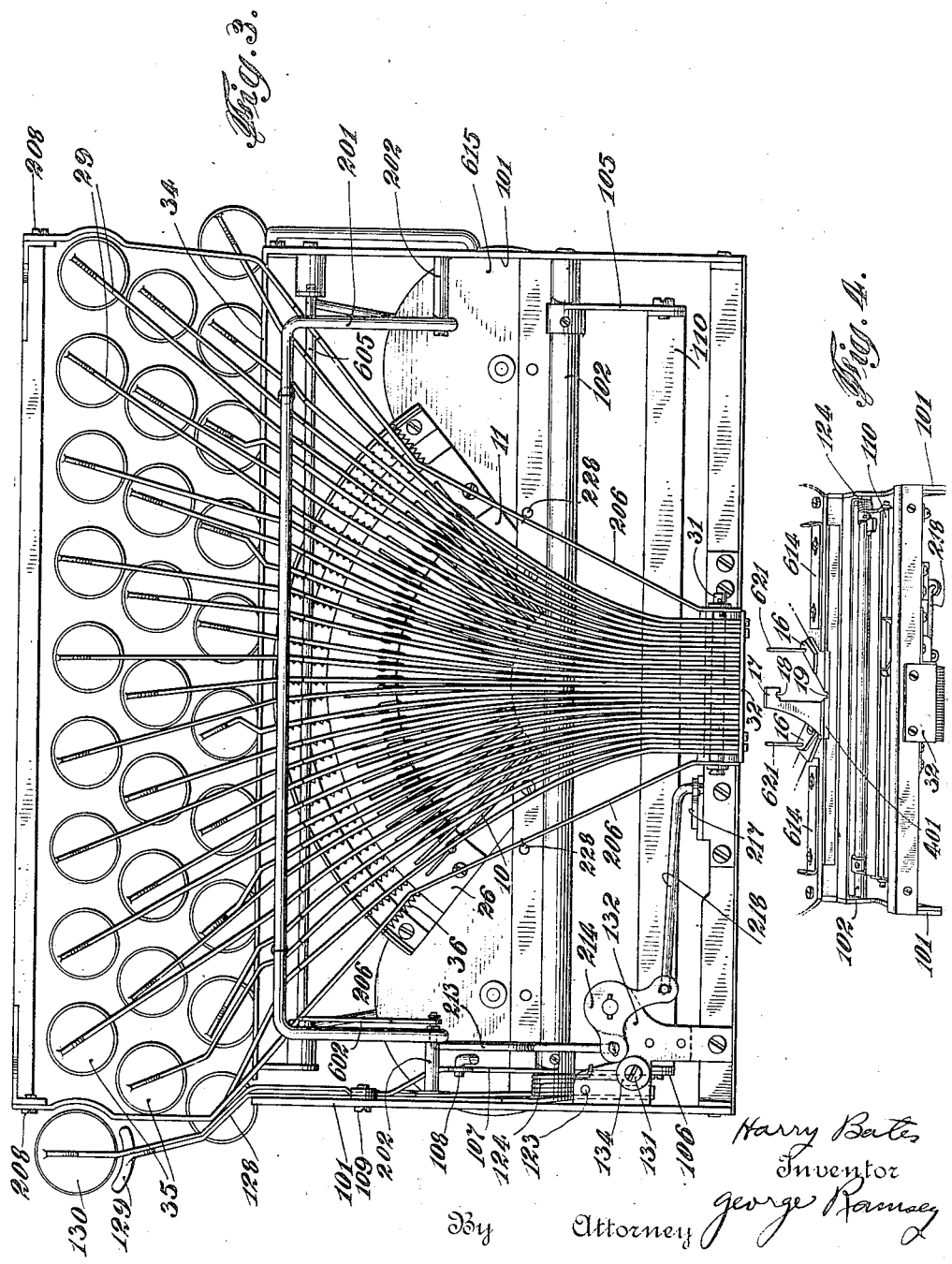

H. BATES

TYPEWRITER

Filed Sept. 2, 1920     13 Sheets-Sheet 4

1,521,214

Harry Bates
Inventor

By   Attorney   George Ramsey

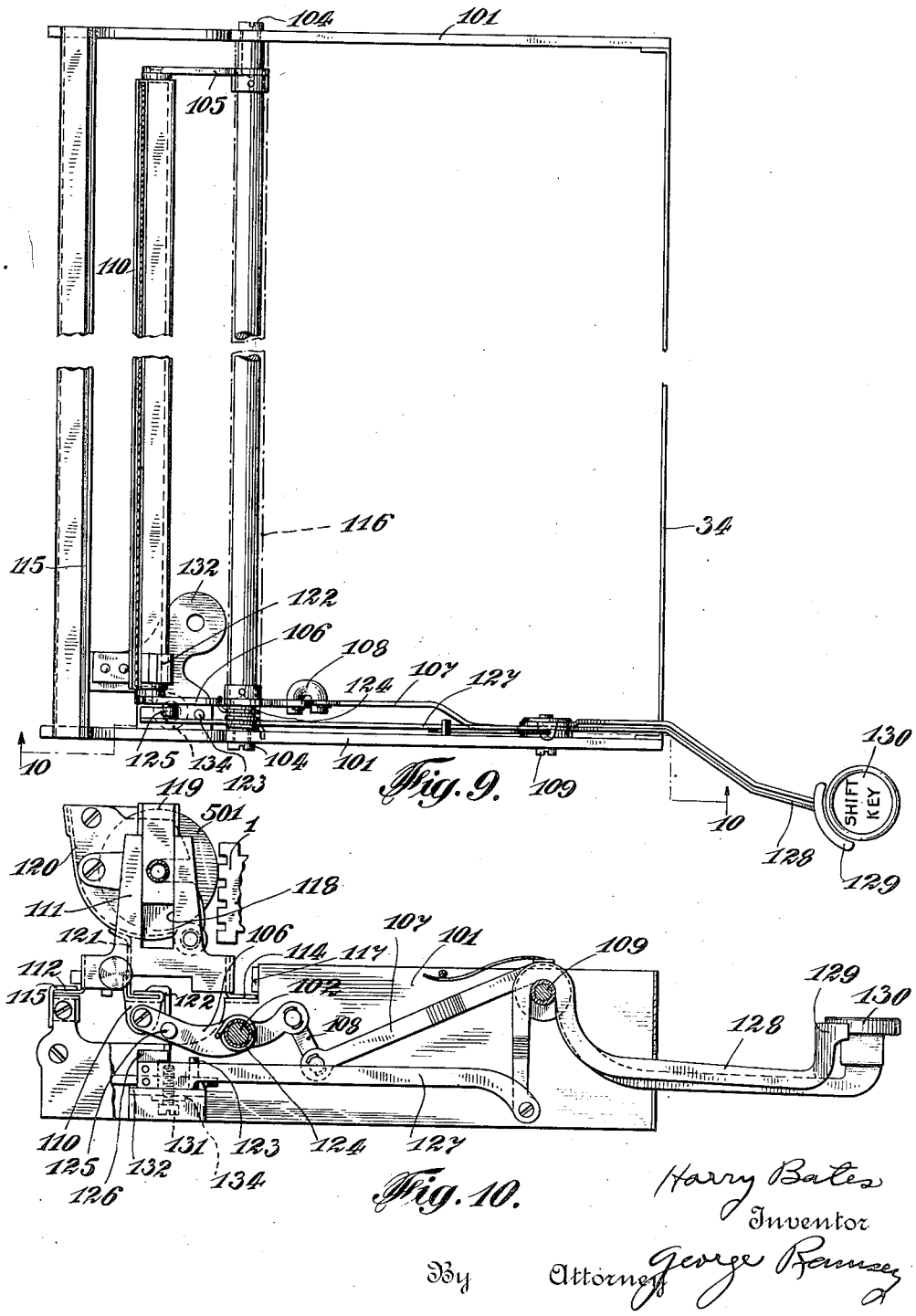

Dec. 30, 1924.  
H. BATES  
TYPEWRITER  
Filed Sept. 2, 1920  13 Sheets-Sheet 6
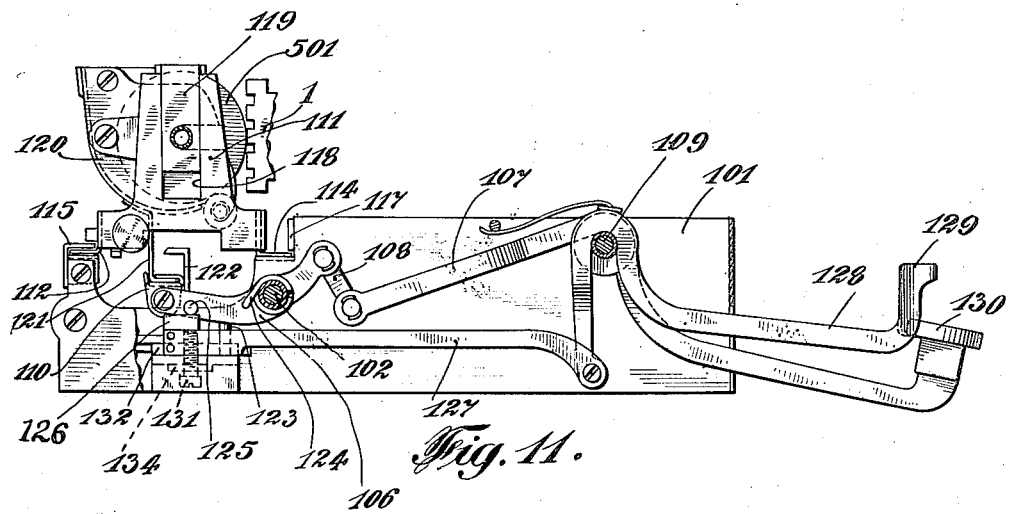
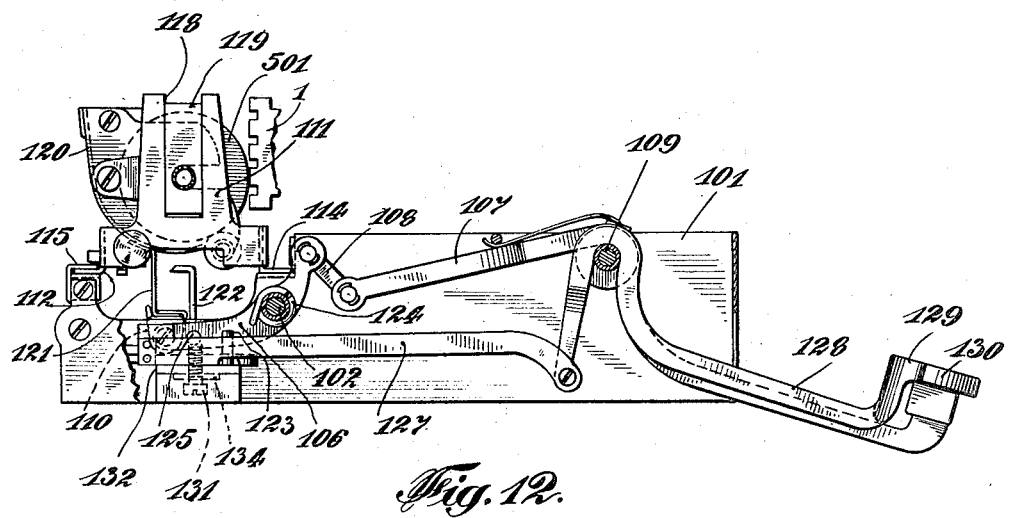

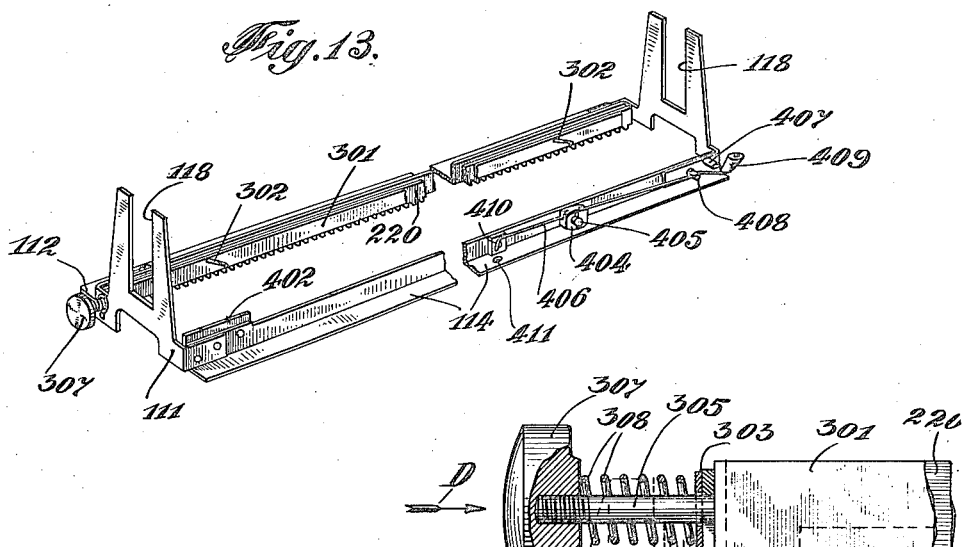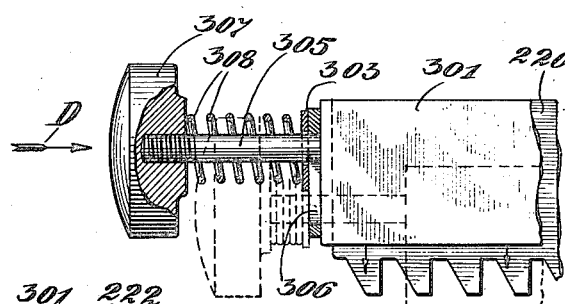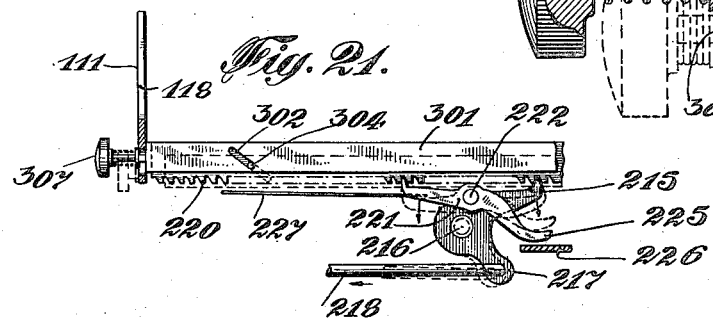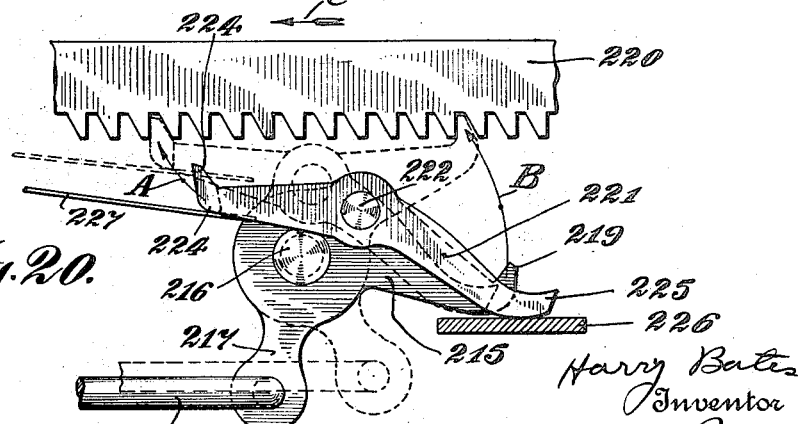

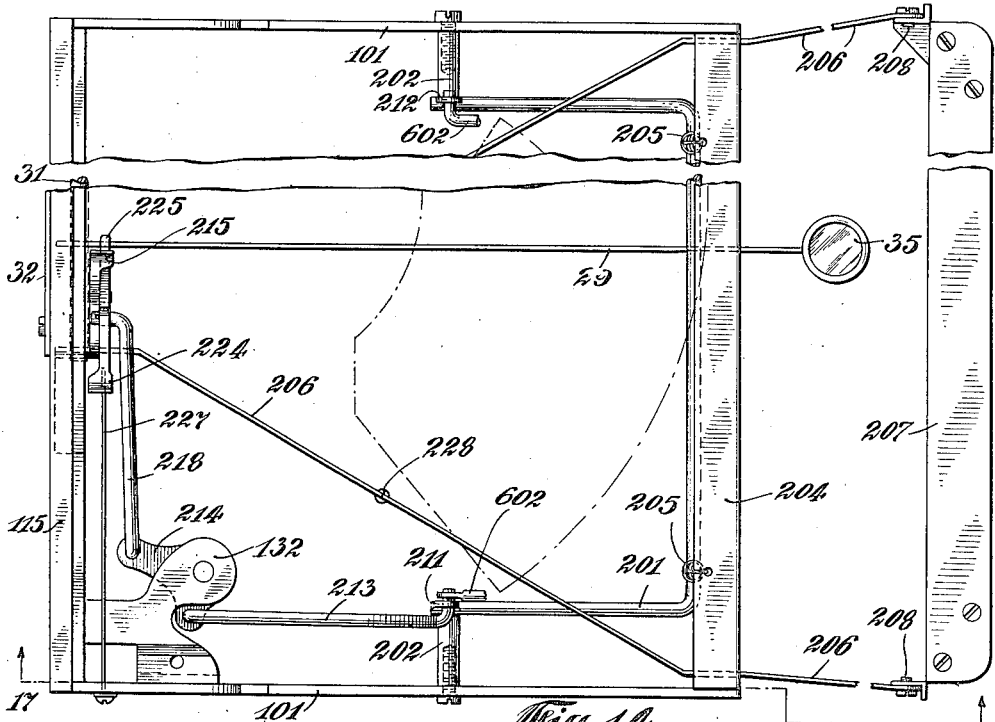

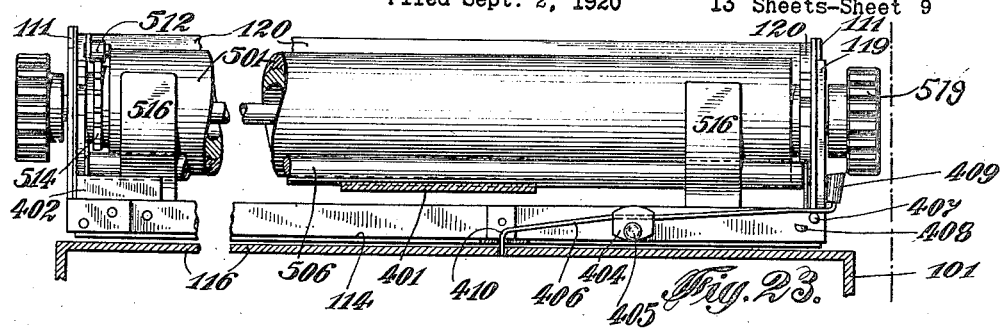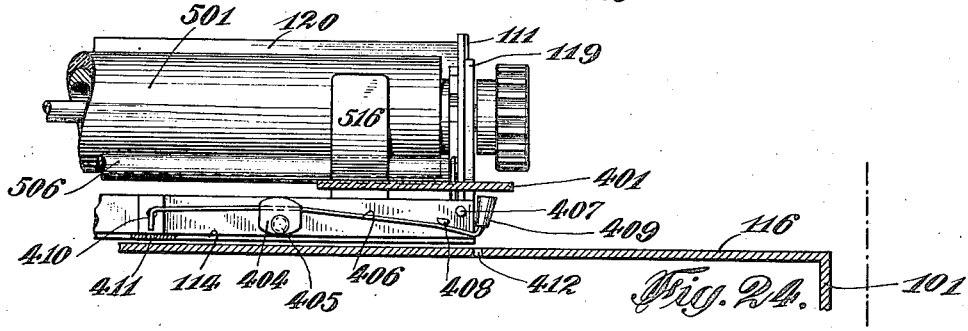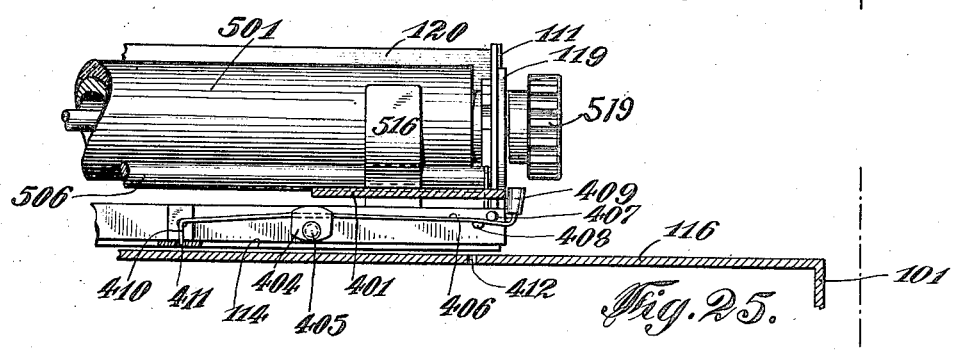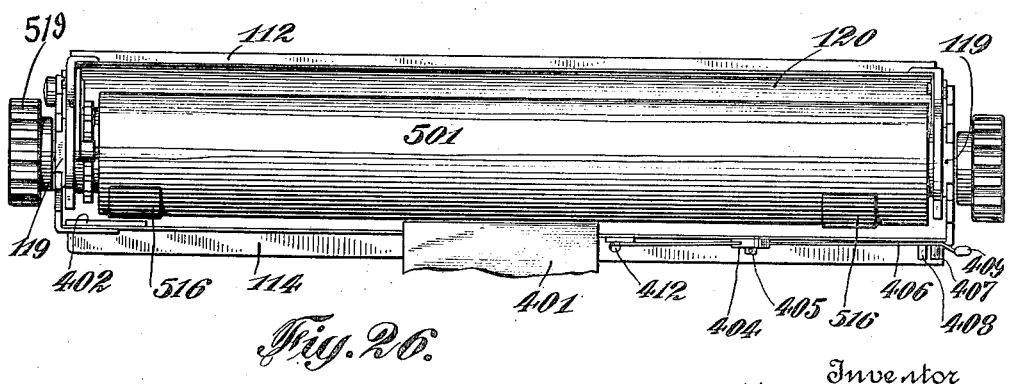

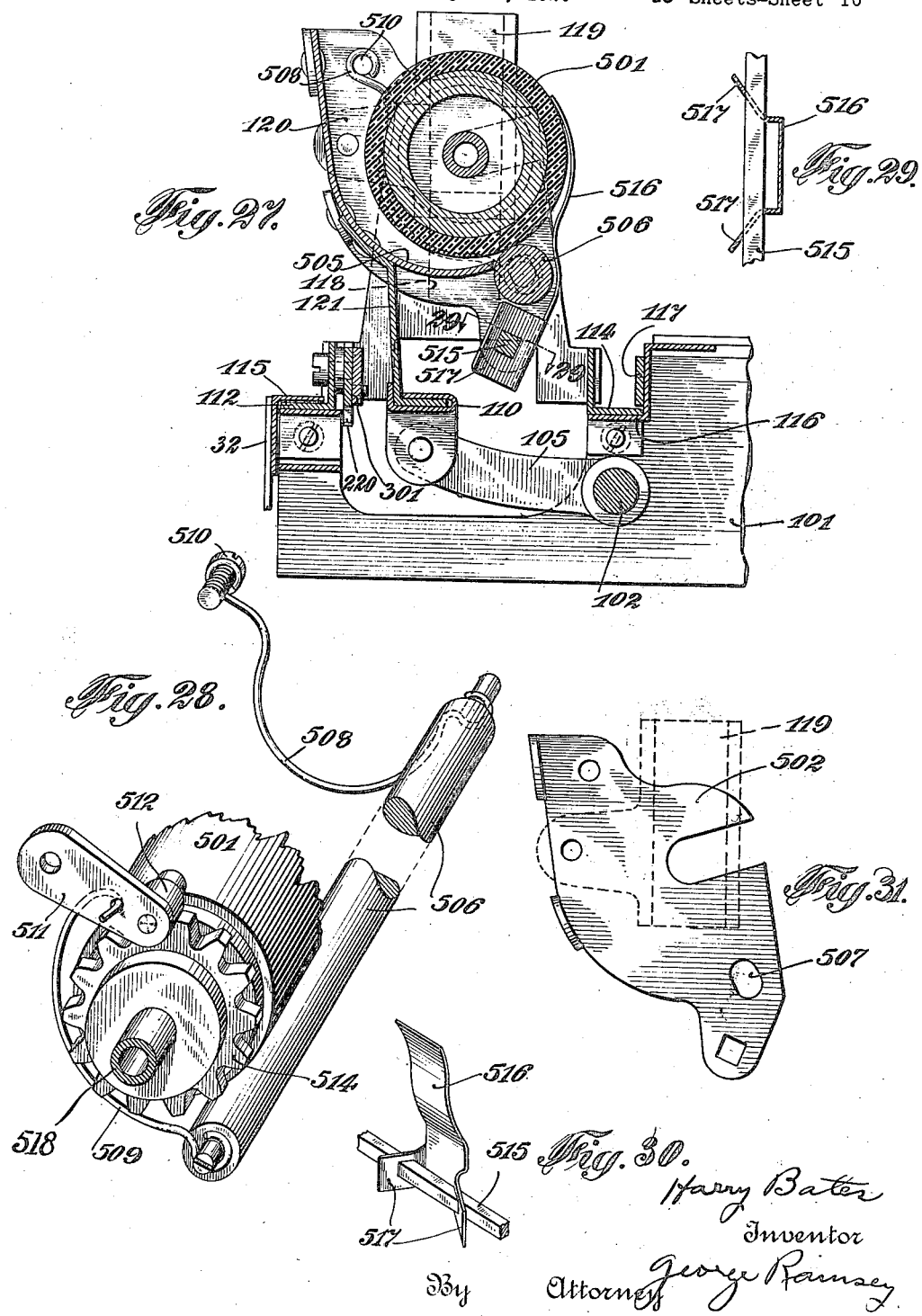

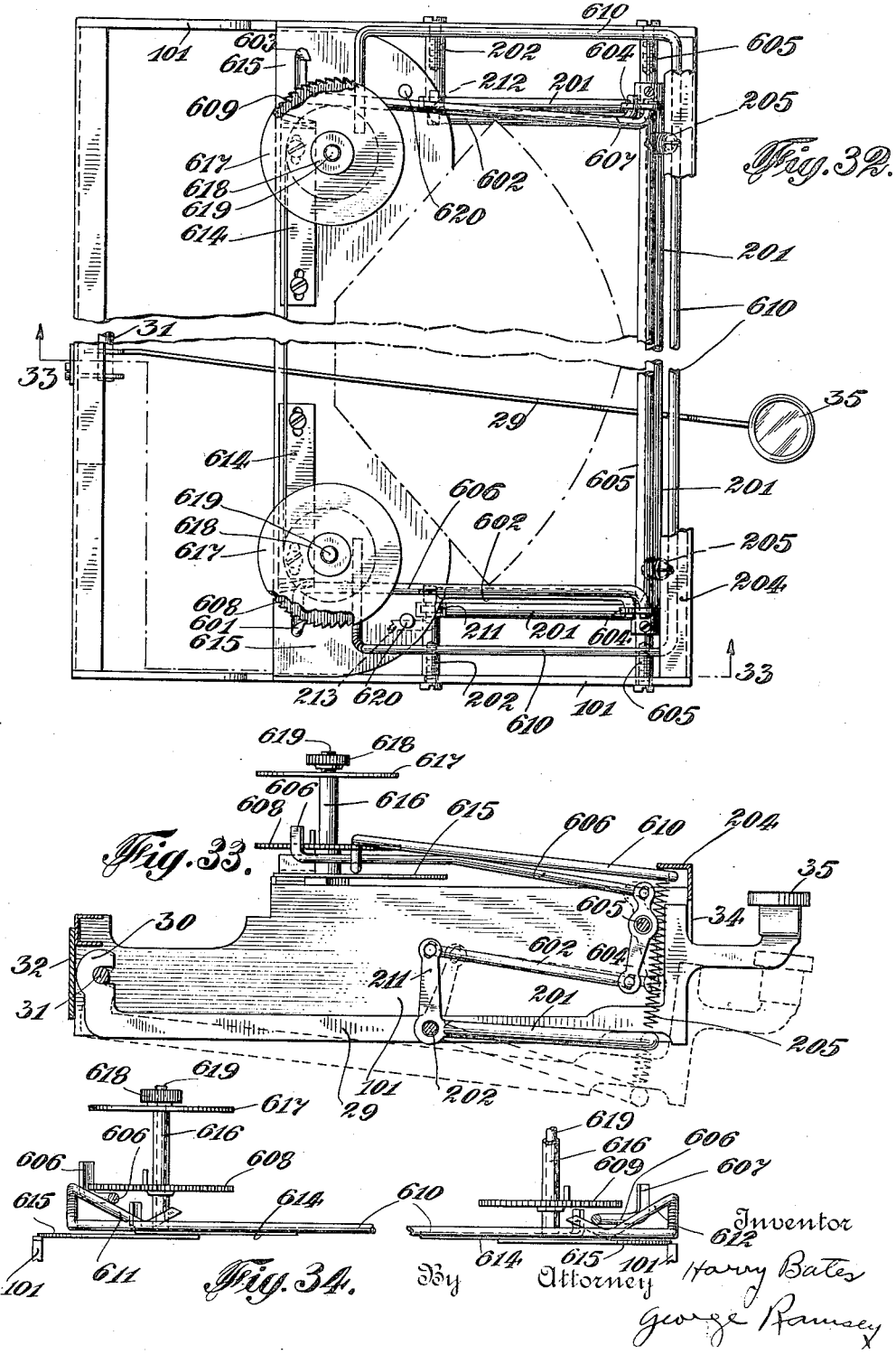

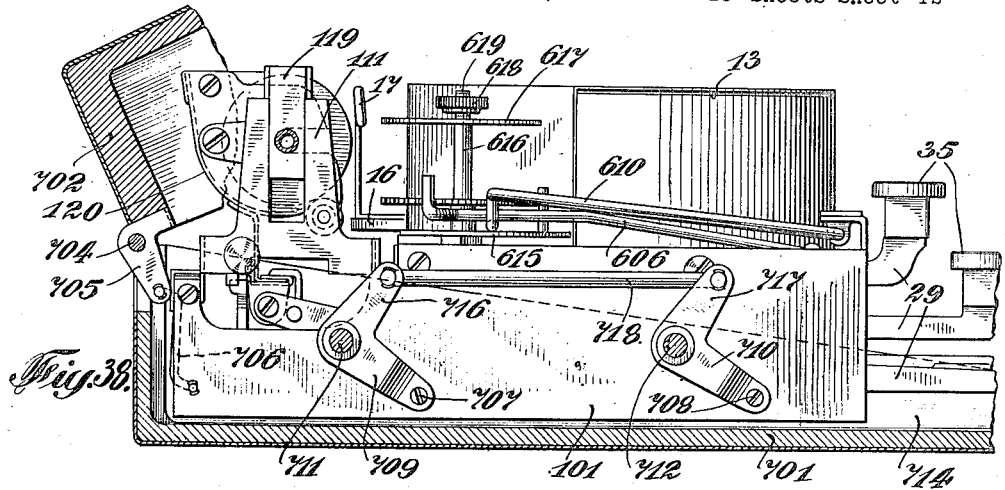
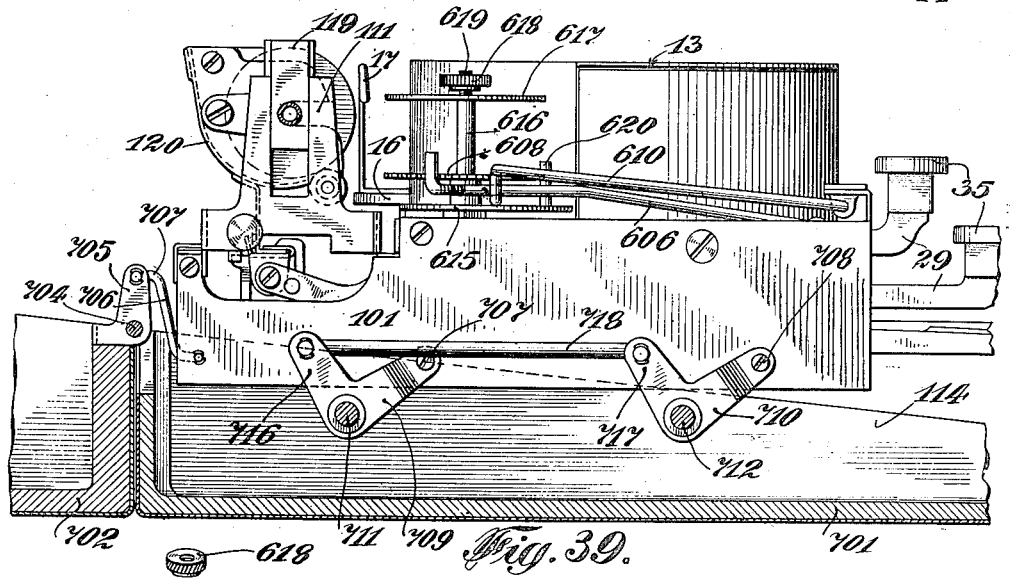
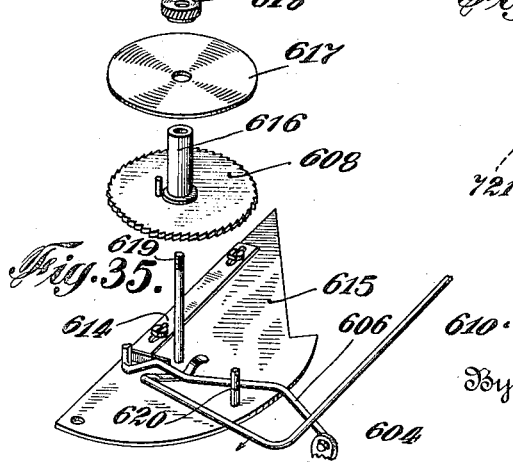

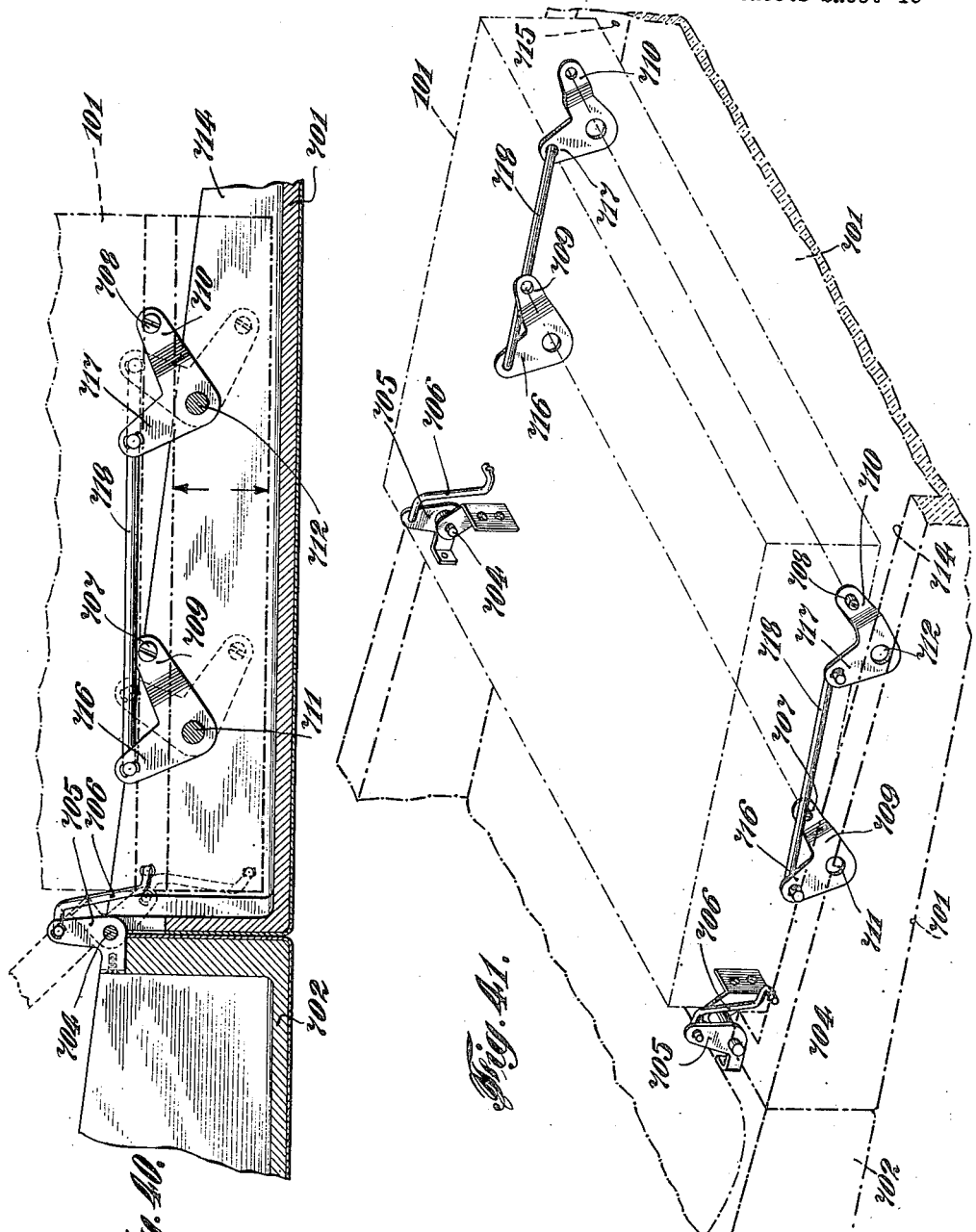

Patented Dec. 30, 1924.

1,521,214

UNITED STATES PATENT OFFICE.

HARRY BATES, OF NEW YORK, N. Y., ASSIGNOR, BY MESNE ASSIGNMENTS, TO ROCHESTER INDUSTRIES, INC., OF ROCHESTER, NEW YORK, A CORPORATION OF NEW YORK.

TYPEWRITER.

Application filed September 2, 1920. Serial No. 407,765.

*To all whom it may concern:*

Be it known that I, HARRY BATES, a citizen of the United States, residing at New York, in the county of New York, State of New York, have invented certain new and useful Improvements in Typewriters, of which the following is a specification.

This invention relates broadly to typewriters and more particularly to a portable machine.

The principal object of the present invention is to provide a typewriting machine capable of performing commercial work and wherein the mechanism is so compacted that the machine may be carried in a moderate sized overcoat pocket.

Another object of the present invention is the provision of a typewriting machine having a standard keyboard and adapted to perform typewriting of a general character with the mechanism compacted into a space slightly larger than an ordinary octavo book.

A still further and important object of the present invention is a typewriting machine having a standard keyboard and end-thrust type bars mounted directly over a portion of the key levers in such manner that the effective vertical height of the operating mechanism is very small and with the machine mounted in a portable frame or case in which the machine frame is movable to provide clearance for operation of the key levers when the portable frame or case is set for permitting operation of the machine.

Another and important object of the present invention is an exceedingly compact, small, typewriter having a standard keyboard with endwise slidable type bars mounted over the key levers and with a short operating lever connecting the type bars with the key levers in order to maintain the effective vertical height of the operating mechanism as small as is consistent with good practice in typewriter construction.

A still further and important object of the present invention is a small compact typewriting machine mechanism mounted in a portable frame provided with devices for raising the typewriter machine frame when the portable frame or carrying case is open.

A still further and important object of the present invention is a typewriting machine, having a machine frame carrying a plurality of key levers which lie substantially within the vertical dimensions of the machine frame and with the machine frame mounted in a portable frame or carrying case which is provided with devices for raising the machine frame to provide clearance for operation of the key levers.

Other and further objects of the present invention will in part be pointed out hereinafter and will in part be obvious from the disclosure in the specification and drawings comprising a part of the present application and wherein like characters are used to represent like parts throughout the several figures thereof.

It is realized that the inventions in the typewriting machine herein disclosed may be embodied in constructions other than those specifically shown and described, so therefore it is desired that the disclosure herewith shall be understood as being illustrative and not to be considered in the limiting sense.

Figure 1 is a perspective view of a complete typewriting machine in accordance with the present inventions and showing a portable frame or carrying case open with a portion of the lid portion cut away;

Figure 2 is a plan view of the machine frame with the carriage, the cover for the type bars, and the ribbon spools, removed;

Figure 3 is a plan view of the bottom of the machine frame removed from the portable frame and with the carriage removed from the machine frame;

Figure 4 is a small detail perspective showing an elevation of the back of the machine frame with the carriage removed;

Figure 8 is a section through Figure 6 on line 8—8 and showing three type bars and operating mechanism;

Figure 5:
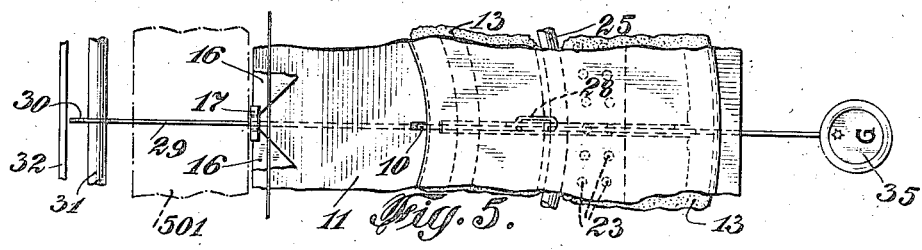
Figure 5 is a detail plan view of a single key lever and type bar illustrating the type bar mechanism.

Figure 9 is a plan view of the machine frame and illustrating the platen shift mechanism;

Figure 10 is an elevational detail view of the platen shift mechanism with the platen in raised position; taken on line 10—10 of Figure 9;

Figure 11 is a view similar to Figure 10 illustrating the platen shift mechanism operated to lower the carriage to intermediate position;

Figure 12 is a view similar to Figure 11 with the carriage in its lowermost position;

Figure 13 is a perspective view of the carriage with the platen removed;

Figure 14 is a plan view of the mechanism for operating the feed dogs;

Figure 15 is a detail view of the feed dogs in engagement with the rack;

Figure 16 is a detail view of the feed dogs disengaged with the rack;

Figure 17 illustrates the operation of the universal bar by the space bar or the key lever;

Figure 18 is a detail view illustrating the folding space bar in normal position;

Figure 19 is a detail illustrating the space bar in folded position;

Figure 20 illustrates in enlarged scale the escapement mechanism operated by the space bar to release the carriage feed;

Figure 21 is a detail view of the carriage release mechanism mounted on the carriage;

Figure 22 is an enlarged view of the operating button construction of the carriage release bar;

Figure 23 is an elevational front view of the carriage with a part broken away illustrating the marginal stop mechanism and showing the lock for holding the carriage in central position on the carriage bed;

Figure 24 illustrates the right-hand marginal stop arranged in inoperative position to render the stop ineffective whereby the carriage may be moved to the left and removed from the carriage bed;

Figure 25 illustrates the right-hand marginal stop in position to be effective as a marginal stop;

Figure 26 is a plan view of the carriage illustrating both marginal stops and the central plate with which the stops cooperate;

Figure 27 is a sectional view in enlarged scale through the platen and paper-feed mechanism and illustrating the paper-feed, apron, roll, etc.;

Figure 28 is a detail perspective view showing the line-space ratchet-wheel and the paper-feed roll together with the springs for forcing the paper-feed roll against the platen;

Figure 29 is a detail view of the mounting for a paper finger; on section line 29—29 of Figure 27;

Figure 30 is a perspective view of the paper finger;

Figure 31 illustrates an end plate of the platen frame;

Figure 32 is a plan view showing the ribbon operating mechanism;

Figure 33 is an elevational sectional view of the ribbon operating mechanism taken on line 33—33 of Figure 32;

Figure 34 is a detail view illustrating the manner in which the ribbon feed dogs are controlled;

Figure 35 is a detail view of one ribbon spool illustrating the connected parts;

Figure 36 is a detail perspective view showing the securing means used in place of cotter pins;

Figure 37 is a sectional view illustrating the pin shown in Figure 36;

Figure 38 is an elevational view illustrating the mechanism by means of which the machine frame is raised or lowered in the portable frame and showing the machine frame in its lowermost position;

Figure 39 is a view similar to Figure 38 showing the machine frame in its raised position;

Figure 40 is a view illustrating the preferred form of the raising and lowering mechanism for the machine frame and showing the amount of movement of the frame;

Figure 41 is a skeletonized perspective view of the raising and lowering mechanism.

The desirability of a portable typewriting machine has long since been recognized in the art and various attempts have been made to provide portable typewriters. Light weight and small size are essentials of a portable typewriter and machines have been designed in which attempts have been made to combine these requisites. The common type of portable typewriter is one utilizing the swinging-bar front-stroke type and wherein the highest mechanism, namely the carriage and ribbon spools, are folded with reference to some other part of the mechanism in order to reduce the vertical height of the package to be carried. In this type of machine it is necessary that an abnormal number of joints be provided between working parts which ordinarily should be maintained rigid and the result is that there is liability of the joints becoming weakened or lossened so that stability is lost, and this is especially true where machine parts are folded. Another type of portable machine has comprised merely reducing the size and lightening the weight of operating parts. Such machines are really semi-portable and are not intended to be, nor are they adapted for being carried about as articles of general portability. A third type of portable machine has comprised key-wheel types of machines having condensed keyboards which are not standard and which are not adapted for use in a general commercial way. There have also been constructed and used various types of toy typewriters which are more or less portable, but such typewriters, however, are not at present under consideration in view of the fact that the present invention is devoted to a commercially useful machine.

The typewriting machine embodying the inventions which will hereinafter be more specifically described, overcomes the difficulties of the known prior art by combining a standard keyboard with a recognized commercial type system, and wherein the associated mechanisms of the machine are constructed and adapted to perform commercial work by an operator trained to operate the ordinary commercial types of standard typewriters. The particular embodiment of the present inventions is associated with, and comprises an end-thrust type bar mechanism wherein the type bar is of very short length and is capable of a short quick action, with the type bar mounted in a very small arced segment and having the operating mechanism of the type bars compacted into a very small vertical space. This compact arrangement is mounted in a machine frame which preferably is secured within a portable frame or carrying case with devices provided for lifting the machine frame relatively to the portable frame when the carrying case is opened to render the machine operative.

*Bar mechanism.*

The principal object of the bar mechanism of the present invention is that of providing a short length type bar with a very compact operating leverage mechanism so that the bars may be associated in a very short, small segment.

A further object of the bar mechanism is the provision of type bars constructed to be guided radially of the segment throughout the length of the bar during the beginning of the stroke and whereas at the end of the stroke only the type ends and the operating ends of the bars are controlled by suitable guides.

A still further object accomplished by the bar operating mechanism, is a type bar of relatively thin metal with a shoulder on the lower edge of the bar and tongues extending from the shoulder into a radial guide slot with an actuating lever extending through the same slot and operating on the type bar in the plane of movement of the bar in such manner as to conserve space between adjacent bars and to apply the forces in the line of movement of the bar.

Figure 6:
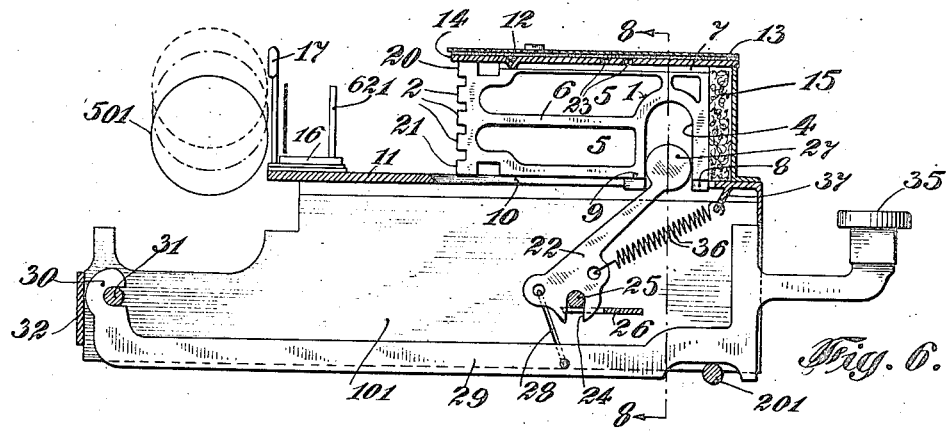
Figure 6 is a detail elevational view illustrating the type bar shown in Figure 5 in its retracted position.
Figure 7:
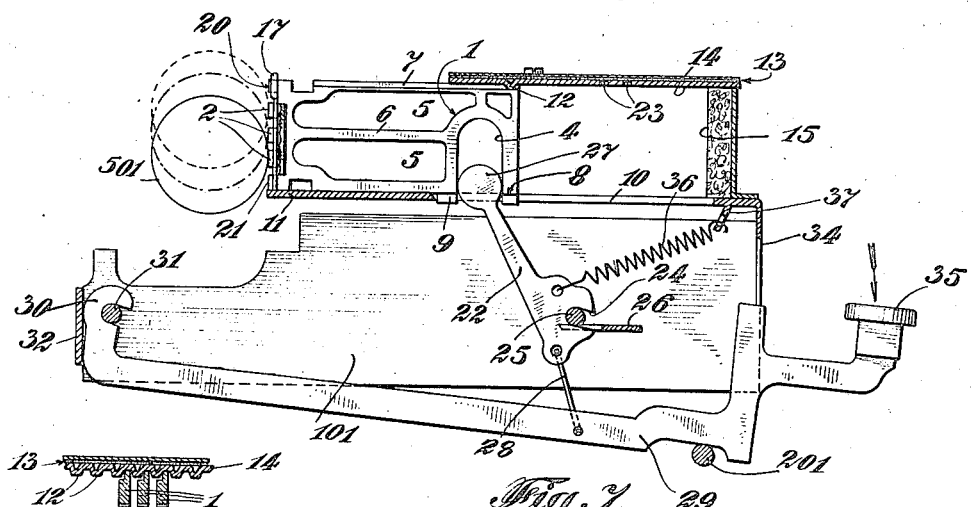
Figure 7 is a view similar to Figure 6 showing the type bar moved forward.
Figure 8:
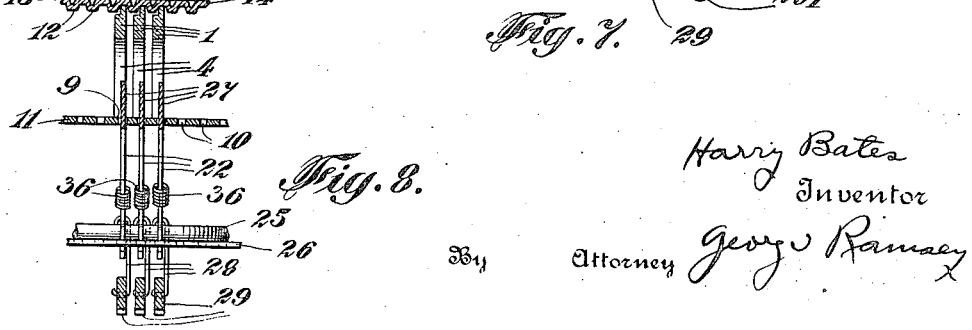

Other features and objects of the type bar mechanism will become obvious by further analysis thereof with reference to Figures 2, 3, 5, 6, 7 and 8 wherein a type bar 1 is illustrated as provided with three type-faces 2 on one end thereof and an operating lever slot 4 in the other end thereof.

The type bar is preferably formed of metal having considerable strength such as an alloy of steel, or the like, and therefore the bar may be cut as at 5 to leave longitudinal ribs 6 that extend substantially back of and reinforce the type faces. This provides a strong and at the same time light type bar which is an element in providing a quick snappy action. The upper edge of the type bars may be provided with longitudinal tongues 7 and the lower edge adjacent the slot 4 preferably is provided with depending tongues 8. These depending tongues extend on one side of the type bar so that the remaining portion of the bar may comprise a shoulder 9 which forms a support on which the type bar may slide over the radial slots 10 (Fig. 2) in the movement of the type bar from rest to printing position. Radial slots 10 are provided in the segment base plate 11, which preferably is hardened metal such as an alloy of steel, or the like, adapted to stand the wear and at the same time provide a smooth friction surface over which the type bars may slide. The upper edges of the type bars are guided by the tongue 7 which slides between projections 12, which may be screws provided in the removable top plate 14 or the projections may be struck from this top plate as is illustrated in the drawings. This top plate 14 may be covered by the cover plate and preferably a felt pad 13 or similar material is placed between the top plate and the cover plate. The top plate preferably is provided with openings 23 which are located over the type bars. Preferably a segmental rebound cushion 15 is provided back of the type bars and against which the bars normally rest. Both the pad 13 and the pad 15 preferably are oil soaked to the proper degree whereby the oil from these pads is released by operation of the machine to oil the type bar and other operating parts. The front end of the segmental base plate 11 is provided with V-shaped guides 16 (Figs. 2, 4 and 5) located adjacent the aligning post 17 which is provided with notches 18 and 19 (Fig. 4) that exactly fit the aligning lugs 20 and 21 (Fig. 6) on the type bars so that when a type bar is driven to printing position the bar is rigidly held by the notches 18 and 19 against both vertical and lateral movement so that each type bar is accurately positioned at the moment of printing. Therefore it becomes unnecessary to guide the intermediate portion of the type bar after it has been started forward in a direct horizontal line in the direction of its length. The type bar tends to move like an arrow and consequently goes straight to the printing point where the aligning features operate as specified to produce substantially perfect alignment and all the momentum of the moving bar may be utilized for printing impact.

Each type bar is provided with an operating lever 22 which has a slotted pivot opening 24 so that the operating levers may be clipped over a segmental pivot wire 25 which lies above the lever spacing comb 26 that guides the operating levers adjacent the pivot points. Each operating lever has a disk-shaped head 27 that operates in the slot 4 in the type bar and provides a line driving contact between the type bar and the actuating lever. A link 28 connects the operating lever 22 with the key lever 29 in such manner that the movement of the point of connection between the link and the operating lever is a circular movement when the key lever is depressed and with the parts arranged so that the effective leverage of the link on the operating lever is substantially maximum for the normal position of the key lever and which decreases as the key lever descends. This construction produces an acceleration of the type bar when the key lever is depressed so that the movement of the disk head on the key lever may be likened to the movement of a stone or weight in a sling. This produces a quick easy action which greatly contributes to speed of operation of the machine. The rear ends 30 of the key levers are slotted and are hooked over the key lever pivot rod 31 where a movable back plate 32 maintains the key levers in position in the rod. The metal from which the key levers are formed is of such thickness that no spacing is required between individual key levers so that the levers are automatically maintained against lateral movement after the levers are positioned over the pivot rod 31. The forward ends of the key levers extend through the front guide comb 34, which is substantially a straight slotted bar extending across the machine frame. Preferably the key levers fan out (Fig. 3) from the pivot wire 31 so that the pull on the links 28 is substantially a vertical pull in the plane of the swing of the levers, thereby avoiding side stress on the several pivot bearings. The front ends of the key levers carry the usual finger keys 35.

Return springs 36 are secured to the operating levers 22 above the pivot wire 25 and preferably extend upwardly whereby the upper ends of the springs are anchored in a segmental rib 37. The effective pull of the springs on the operating levers is somewhat in the direction of the length of the levers, when the parts are in normal position, so that the resistance of the springs to the key lever action is least when the key lever is in normal position. Consequently the pull of the spring is not appreciated by the operator in starting to depress a key lever. As the operating lever moves forward and the parts gain in momentum, the return springs 36 are stretched until the momentum of the moving parts is absorbed by the type impact in printing. As soon as the momentum is absorbed the action of the spring becomes effective to quickly return the parts to normal position. This action is rendered more effective due to the fact that the effective pull of the spring on the operating lever is greatest when the type bar is at or near the printing point. This arrangement of parts takes advantage of the absorption of momentum in the printing impact, of the rebound of the type bar from the platen, and of the maximum effective efficiency of the return springs, to provide an exceedingly quick, positively accelerated return.

From the foregoing it will appear that the parts have been constructed with the connections arranged in such manner as to provide a very quick movement in throwing the type bar to the printing point and an equally quick movement in returning a type bar to normal position.

*Case shift and carriage mechanism.*

The principal object of the case shift mechanism about to be analyzed is to provide a construction simple in operation and rigid in form for causing relative movement between the platen and the path of travel of the different groups of types in such manner as to enable the printing to be shifted from one group of type to another.

In the present machine, embodying end-thrust type bars, relative movement preferably is occasioned by moving the platen while maintaining the path of the type fixed, so that the upper, the middle, or the lower groups of types may be selectively chosen as the operative group.

More specially the case shift mechanism comprises a carriage forming a guide for movement of the platen and paper feed mechanism relatively to the path of the type bars. The position of the platen is determined by stops, certain of which may have a movement relative to others of the stops in order to provide for selective positioning of the platen as specified.

Preferably the selective movement is accomplished by key levers so positioned as to be capable of operation by a single finger so that the desired shift may be obtained by a minimum mental effort on the part of the operator.

Referring now more particularly to Figures 9, 10, 11 and 12 of the drawings, the machine frame 101, which preferably is made of pressed sheet steel, aluminum, or other material having suitable strength and lightness, carries a platen supporting shaft 102 which is securely mounted in the machine frame by means of stub screws 104. This shaft 102 is provided with arms 105 and 106, with the arm 106 adjacent the left side of the machine frame being extended to form a lever to which the shift key lever 107 is connected by means of a U-shaped link 108. The shift-key lever extends over a stub screw mounting 109 and is open on the under side for the purposes which will later be explained. A channel bar 110 is pivoted between the forward ends of the arms 105 and 106. The carriage frame 111 is mounted over channel bar 110 and is provided with outstanding flanges 112 and 114 on which the carriage slides. The flange 112 at the back of the carriage extends into a groove comprising the rear carriage runway 115 and the forward flange 114 sets upon a suitable supporting plate (see Fig. 2) 116 and slides beneath the retaining plate 117. The carriage is provided in each end with vertical slots 118 in which the end guide-plate 119 of the platen frame 120 is adapted to slide vertically. An L-shaped bar 121 extends from beneath the platen frame 120 and fits within the channel bar 110 so that any vertical movement in the channel bar raises or lowers the platen frame in the carriage. The L-shaped bar 121 has the same longitudinal movement in the channel bar 110 that the flanges 112 and 114 have in their respective guideways. An L-shaped finger 122 is adapted to extend over the path of vertical movement of the channel bar 110 and to comprise the stop limiting the upward movement of the channel bar, whereby the printing point on the platen is in the path of the uppermost type on the type bars. A coiled spring 124 is coiled around the platen supporting shaft 102 with one end anchored to the frame 101, and the other end to the arm 106, with the spring acting to normally turn the platen shaft to lift the channel bar 110 against the L-shaped stop 122. This normally holds the platen in raised position so that the upper group of type are normally effective for printing.

The lever arm 106 is provided with an outstanding lug or stud 125, a block 126 mounted on the longitudinally movable bar 127 is guided by the post 123, and is normally positioned beneath the stud 125 so that the normal depression of the shift-key lever turns the platen shaft 102 until the stud 125 engages the block 126. This position determines the intermediate position of the platen so that the middle group of type will be aligned with the printing point on the platen. (See Fig. 11.) A selective key lever 128 is pivoted on the stub screw mounting 109 and this key lever is provided with a segmental finger key 129 which encircles a portion of the shift-key button 130 so that a single finger may be positioned on the shift key and extend over the edge thereof sufficiently to depress the selective key lever simultaneously with a depression of the shift-key lever. Such a movement causes the longitudinally movable bar 127 to move endwise, thereby moving the block 126 from beneath the stud 125 so that the supporting shaft 102 may be further turned to continue the downward movement of the platen. An adjustable stud screw 131 is mounted in the bracket 132 on the machine frame and is held in position by a small check nut 134. The upper end of this stub screw 131 contacts with the stud 125 and thereby limits the depression of the platen so that the lower group of type are rendered effective to print, when the stud 125 contacts with the stub screw 131. The key lever 107 and the selective key lever 128 are both open beneath the stub screw mounting 109 in order to permit a yielding of these parts when pressure is brought in a vertical direction upon the platen and without tripping the key levers. It will be remembered that the present shift key mechanism is adapted for use in a typewriting machine which sets in a portable carrying frame or case with the machine frame setting directly on the portable frame when the machine is compacted to be carried. The portable frame may comprise a hinged lid which in closing may contact with the platen and if the platen is forced downwardly by closing of the lid, the shift key levers resting on the portable frame would not be able to tip so therefore since the under parts of the levers are open over the pivots the levers may rise from their pivotal mount thereby obviating any danger of straining the parts.

The carriage mechanism is so closely associated with the case shift mechanism that these two groups will be described under the same general heading.

Referring now more specially to Figures 2, 10, 13 and 27, the carriage mechanism comprises a carriage frame 111 provided with the outstanding flanges 112 and 114, specified, adapted to support and guide the carriage in the runways on the machine frame 101 with flange 112 in the rear runway 115, and flange 114 sliding on the supporting plate 116 and held in position by the retaining plate 117. The ends of these flanges are connected by the carriage frame end plates which are provided with vertical slots 118 that guide the end guide-plates 119 on the platen frame 120, and the depending L-shaped bar 121 on the platen frame is slidable in the channel bar 110. Preferably the parts described are pressed sheet steel or similar material having sufficient strength and rigidity so that the carriage mechanism is exceedingly simple, light and strong. The carriage is limited in its endwise movements by marginal stops which will be later described and upon proper adjustment of these stops, the carriage may be removed from the carriage bed so that carriages and platens of different lengths may be easily interchanged when desired.

Carriage feed.

The principal object of the carriage feed mechanism of the present invention is to provide a feed which is exceedingly simple and which is positive in action so that the necessity for spring drums is obviated and with the feed so constructed that during feeding movement the carriage may be entirely free to be positioned as desired.

Another object of the carriage feed in accordance with the present invention is a construction wherein the return spring for the connected feed parts is so constructed as to cause positive feeding movement of the carriage on the return stroke of the parts with the effective force of the spring being applied to the carriage rack in the direction of its length under conditions which permit the maximum effectiveness of the spring and wherein the letter feed movement is positively stopped by one of the feed dogs, so that immediately after printing the carriage is locked.

Another important object of the present invention is to provide a carriage feed mechanism wherein the carriage is unlocked prior to type impact at the printing point and is relocked after the printing has occurred with the feed movement taking place just after printing.

Referring more specially to Figures 14 to 20 inclusive, the universal bar 201 is pivoted on studs 202 mounted on the machine frame 101 about the lower middle part thereof. The front guide comb 34 is provided with an overhanging ledge 204 to which coil springs 205 that are carried by the universal bar 201, are anchored. These springs exert a direct lifting action on the universal bar thereby maintaining the universal bar beneath the key levers 29 and beneath the space bar levers 206. These space bar levers are connected at their forward ends by a folding space bar 207 which is pivoted at 208 to the levers 206. The ends (Figs. 18 and 19) of the levers 206 are provided with shoulders 209 against which a stop plate 210 is adapted to rest when the space bar is down in normal position as shown in Figure 18. The stop plate 210 is adapted to contact with the upper side of the space bar levers 206 when the space bar 207 is raised to vertical, or folded position in order to shorten the length of the machine to more compactly fit it into a portable frame.

The universal bar 201 adjacent the pivot therefor is provided with upstanding arms 211 and 212, and the arm 211 is connected by a link 213 with a bell crank 214 which is pivoted on the bracket 132 that is attached to the main frame 101. A locking dog 215 is pivoted at 216 to the back wall of the main frame 101 and this locking dog 215 is substantially a bell crank having one arm 217 connected by link 218 to the bell crank 214. The other arm or end of the locking dog 215 is provided with a nose 219 which is adapted to fit into the teeth of the rack 220 which is fixedly mounted on the carriage frame 111. The feeding dog 221 is pivoted as at 222 to the locking dog 215 above the pivot 216. The forward end of the feed dog 221 is provided with a feeding nose 224 which is also adapted to engage the teeth of the rack 220. The opposite end of the feeding dog 221 is provided with a tail 225 which is adapted to engage and slide upon the plate 226, mounted on the machine frame, when the locking dog is released from the rack. A wire or flat spring 227 engages the feeding dog 221 adjacent the nose thereof and normally tends to urge the nose of the dog between the teeth of the rack 220.

Assuming the dogs to be in the position shown in Figure 15 and the key levers as shown in full lines Fig. 17, then supposing the key lever to be depressed to occupy the dotted line position in Figure 17, the universal bar and connected parts will operate the feed dogs to cause the locking dog, to strike the stop plate 226 and the tail 225 of the feeding dog to slide on this plate 226 thereby removing the nose 224 of the feeding dog of the rack, thus leaving the rack momentarily free. This action takes place as a type bar moves to the printing point and also when the space bar is depressed. The space bar is normally held suspended by coil springs 228, so that it does not drop when a printing key lever is depressed. After printing has been accomplished and the pressure is released on the key button. the springs 205 lift the universal bar and cause the feeding dogs to move in the direction of the arrows A and B in Figure 20. It will be noted that the arrow A indicating the path of the feeding nose 224 is shorter than the arrow B and is more in the direction of the length of the rack. It therefore follows that the longitudinal movement of the feeding nose 224 advances the rack in the direction of the arrow C a proper feeding interval before the locking nose 219 enters the rack teeth. At the conclusion of the movement (dotted lines Fig. 20) it will be noted that both dogs engage the rack and rigidly hold the rack against longitudinal movement.

From the foregoing it will be clear the feeding mechanism is exceedingly simple, light, strong and effective.

Carriage release.

The principal object of the carriage release mechanism is the provision of a simple, efficient construction adapted to release the carriage from the action of the carriage feed dogs in order to permit the carriage to be positioned at the will of the operator.

The present invention contemplates two distinct mechanisms by means of which the release may be effected, one comprising a construction mounted upon the carriage and the other comprising the feeding mechanism previously described wherein the carriage may be released by holding down the space bar.

Referring more specially to Figures 13, 20, 21 and 22, the release bar 301 is mounted adjacent the rack 220 for vertical sliding movement parallel to the side of the rack and in direction which the rack teeth extend. The release bar is provided with diagonal slots 302 through which extend stationary pins 304 that are secured to the rack. A push rod 305 is secured to one end of the release bar and extends through a slot 306 in the end of the carriage frame. The end of the push rod carries a push button 307. A sliding washer 303 rests against the end of the carriage frame over the slot 306 and a compression spring 308 extends between the washer and the punsh button. When the washer and the push button. When the arrow D the parts assume the position indicated in dotted lines in Figures 21 and 22 wherein the push arm has moved diagonally in a longitudinal and downward direction. The ends of the noses 119 and 224 on the feed dogs are sufficiently broad to extend beyond the rack in a sidewise direction to be in the path of the release bar 301 when occupying the dotted line position specified, so that both dogs are pushed from position between the rack teeth, as shown in Figure 21, thereby releasing the feed dogs from the rack and permitting the carriage to be freely movable in an endwise direction within the limits of travel determined by the marginal stops.

By referring to Figures 17 and 20 it will be noted that when the space bar 207 or a key lever 29 is depressed the feeding dogs are disengaged from the rack. If it is desired the space bar 207 may be held in depressed position by one hand while the carriage may be freely moved with the opposite hand, within the limits above specified, and when so operated the space bar and connected parts become a release mechanism which is independent of the mechanism operated by the push button 307.

The release mechanisms previously described are of exceeding simplicity and carriage release may be effected either from the key board or from the carriage in the manner specified.

Margin stops.

The principal object of the margin stops devices of the present invention is to provide an effective, simple, marginal stop construction which may be utilized for limiting the carriage travel and unlocking or releasing the carriage so that it may be removed from the carriage bed as may be desired.

Another object of the present invention is a marginal stop capable of being operated to center the carriage on the machine frame when it is desired to arrange the machine in the portable frame or case so that the carriage will automatically be positioned and held in such manner as to maintain the parts within the smallest width of the machine.

Referring more specially to Figures 23, 24 and 25 the carriage frame 111 carrying the platen frame 120 is slidably mounted on the machine frame 101 in such manner that the forward portion of the carriage frame travels beneath the stop plate 401 (see also Figures 2 and 4). The left-hand end of the carriage frame carries a stop 402 which may be movable for adjustment as is desired but in order to maintain simplicity this stop preferably is anchored on the carriage frame as is indicated in Figures 23 and 26. It therefore follows that the travel of the carriage in a right-hand direction is stopped when the marginal stop 402 contacts with the edge of the stop plate 401. A pivot block 404 may also be movable on the carriage frame, but preferably is pivoted to the carriage frame as at 405 and this pivot block carries a flexible member 406 which may comprise a flexible wire or the like. A pair of stop pins 407 and 408 are provided adjacent the support of the pivot block which may comprise the right-hand end of the carriage frame and the flexible member 406 carries a stop head 409 which extends upwardly adjacent the stop 407 and 408. When the flexible member 406 is positioned above the stop pin 407 the hook end 410 of the member 406 which extends through an opening 411 in the flange 112 bears against the trackway in the main frame 101. The carriage is moved along until the hook end reaches the opening 412 in the supporting plate 116, when the hook drops into this opening. This locks the carriage centrally of the main frame so that the main frame may be quickly positioned in a suitable portable frame, and a lid or other support folded over the machine.

When the flexible member 406 is positioned between the stop pins 407 and 408 (Figure 25) the stop head is securely held in a position to strike a stop plate 401 when the carriage is moved to the left to the limit of its travel. This stop head 409 therefore under such conditions constitutes the margin stop for the right-hand end of the carriage. When the flexible member is positioned beneath the stop pin 408 (Figure 24) the stop head is below the stop plate 401 and the carriage may continue movement in the left-hand direction until it is completely removed from the carriage guides.

In view of this arrangement it is possible and very easy to provide carriages or platens of different lengths so that longer or shorter platens and carriages may be used to accommodate papers of different widths according to the desire of the operator.

*Paper feed.*

The principal object of the paper feed mechanism is a simple construction capable of satisfactorily handling suitable paper or the like, with carbons, etc. and wherein the parts are arranged to stand the severe usage to which a portable machine may be subjected.

Referring to Figures 27 to 30 inclusive, the platen 501 is mounted for rotation in a platen frame 120 which comprises end plates 502 to which are secured guide plates 119 adapted to guide the platen in the carriage frame during case shift movement. The end plates 502 are secured to the apron 505 which extends forwardly beneath the platen and which terminates adjacent the paper feed roller 506 which is beneath the forward under portion of the platen. The ends of the paper feed roller extend through slotted openings 507 which constitute guides for this roller to permit the roller to yield when varying thicknesses of paper are fed between the roller and the platen. A pair of looped springs 508 and 509 engage the ends of the paper feed roller to pull the paper feed roller tightly against the platen. These springs are curved to lie in the spaces between the rubber surface of the platen and the end hubs thereof. The spring 508 is anchored to a stub screw 510 carried by the end plate 502, and the spring 509 is anchored to the line space detent arm 511 which is pivoted to the left-hand end-plate. This arm 511 carries a detent roller 512 that cooperates with the teeth in a line space wheel 514, in order to position and hold the platen for line spacing. The spring 509 therefore performs the double function of holding the detent roller in engagement with the line space wheel and also pulls the left end of the paper feed roller against the platen. A paper finger bar 515 extends across the platen frame beneath the paper feed roller and carries a pair of slidable paper fingers 516. These paper fingers are provided with wings 517 of resilient or spring material and these wings tend to lock or retain the paper fingers in adjusted longitudinal position. The paper fingers are curved over the paper feed roller and extend upwardly into engagement with the front portion of the platen to secure and hold the paper in position against the platen after it has passed the paper feed roller. It is also to be understood that the ends of the platen shaft 518 carry the thumb wheels 519 by means of which the platen is turned for line spacing or other purposes.

From the foregoing it will appear that the paper feed mechanism of the present typewriter is of a simple construction which is positive and accurate in its action.

*Ribbon mechanism.*

The principal object of the ribbon mechanism is to provide an efficient ribbon mechanism with as few operating parts as possible to properly operate the mechanism and wherein the ribbon is transferred from one ribbon spool to another by operation of the universal bar, and with the change of direction or shift of the ribbon being manual.

The ribbon is preferably drawn across the front of the platen loosely in such manner that the type drives the ribbon against the paper at the printing point without undue tension on the ribbon, and the ribbon feed occurs after the type stroke whereby the ribbon feed sufficiently tensions the ribbon to withdraw the free portion from the printing point so that the writing is visible.

Referring more specially to Figures 32 to 35 inclusive the ribbon operating mechanism comprises the universal bar 201 pivoted to the main frame by means of studs and normally maintained in raised position by coil springs 205. The forward ends of the universal bar are provided as specified with upstanding arms 211 and 212. These arms are connected by links 602 with levers 604 on the rock shaft 605 which extends across the forward portion of the main frame 101. The upper ends of the rock shaft levers 604 carry ribbon feeding arms 606 and 607 which are oppositely bent at their forward ends to comprise pawls 601 and 603 which are adapted to engage with the ratchet wheels 608 and 609 respectively of the right and left hand ribbon spools. A reverse member 610 comprises a U-shaped wire which is slidably mounted beneath the ledge 204 on the front comb 34 so that the U-shaped member may be moved individually in a direction transversely of the machine frame. The forward ends of this reverse member 610 are in-turned beneath the spool ratchet wheels 608 and 609 and are bent to form U-shaped supports 611 and 612 over which the feeding arms 606 and 607 are adapted to ride. Adjustable stop plates 614 are mounted on the top plate 615 and form guides against which the feeding arms 606 and 607 also slide, to prevent the pawls 601 and 603 from engaging the ratchet teeth too quickly which might cause excessive ribbon feeding. By referring to Figures 32 and 34 it will be noted that the left-hand ribbon spool ratchet wheel is raised and rides at one edge on part of the U-shaped support 611. This support when so engaged forms a friction construction so that when the feeding dog 601 engages the ratchet wheel 608 the amount of feeding movement will be held and not be lost on the return stroke.

Again referring to Figures 32 and 34 and to the right-hand end construction, it will be noted that the feeding arm 607 has been carried by the U-shaped support 612 so that it is out of contact with the ratchet wheel 609. By moving the reverse member 610 to the left the conditions will be reversed and the feeding dog 603 will engage the ratchet wheel 609 while the feeding dog 601 will be disengaged from ratchet wheel 608. The ratchet wheels 608 and 609 are provided with vertical tubes 616 upon which the top spool plates 617 are adapted to be held by means of the thumb nuts 618 which screw thread upon the ribbon spool posts 619, upon which the tubes and plates have both rotative and vertical movement. Guiding posts 620 are provided on the top plate 615 to limit the outward swing of the ribbon feeding arms 606 and 607, to prevent the arms becoming dislodged during transporting the machine, or otherwise.

From the foregoing description it will be clear that when the space bar or the key lever is depressed the universal bar will be operated to rock the rock shaft 605 and cause a to and fro movement in the ribbon feeding arms 606 and 607 which are adapted to engage the ribbon ratchet wheel in the manner previously disclosed to cause a ribbon feeding movement.

Referring now to Figures 2 and 4, it will be noted that the guard posts 621 are provided on either side of the aligning member 17. The ribbon extends over the guard posts between the posts and the type faces so that at the printing moment the type face carries the portion of the ribbon between the guide posts inward against the paper, and as previously stated the feeding movement of the ribbon which occurs on the return stroke tensions the ribbon and the guide posts act to draw the ribbon away from the printing point when it is tensioned.

It will be observed that the ribbon mechanism is very simple in character and is adapted to carry a standard commercial ribbon which may be fed alternately from one ribbon spool to the other at the will of the operator.

*Portable frame and general construction.*

The principal object from a general view of the present invention is a rugged, compact, non-folding typewriter provided with a standard keyboard and adapted particularly to portability.

To carry out the features of portability of the present invention it is desirable that the mechanism be compacted as much as possible and to this end the present invention contemplates a portable frame in which the main machine frame, carrying the operating mechanism, may be mounted.

While the portable frame and the main frame may be associated in many ways the preferable construction is that wherein the main frame is secured in the portable frame in such manner that the same may comprise a carrying case with the parts so mounted that the opening of the carrying case raises the machine frame to operative position. Preferably the parts are arranged in the machine frame in a compact arrangement but without folding or otherwise disturbing the normal relation of the operating parts. It is preferable, however that these parts shall normally lie within limits which are less than the limits required for operation, for example, the machine frame may be of such height as to be level or even with the lower edge portion of the key levers so that when the machine frame sets on the bottom of the case or portable frame, the key levers cannot be depressed. In view of the above fact it becomes necessary to provide relative movement between the portable frame and the main frame in order to establish the necessary clearance for the operation of the key levers.

Referring now to the drawings and more specially to Figures 1, 2, 3, 38, 39, 40 and 41, the portable frame comprises a casing having a supporting side or base 701 and a cover 702 which is hinged at 704 to the base 701. The hinges preferably are formed with extending arms 705 which are connected by means of curved links 706 with the forward end of the main frame 101. This main frame is provided on each side with pivot screws 707 and 708 which connect the main frame with the outer arms 709, and 710 of the bell crank levers that are pivoted at 711 and 712 to the edge members 714 and 715 of the supporting base 701. The upwardly extending arms 716 and 717 of the bell cranks are connected together by links 718 in order to provide for consonant movement of the bell cranks to constitute a parallel guide movement for raising and lowering of the main frame relative to the portable frame or carrying case.

With reference to Figures 40 and 41, which diagrammatically illustrate the mechanism previously described and show the amount of movement of the main frame 101 relatively to the supporting side, or base 701 of the portable frame.

As previously specified, Figure 3 illustrates a bottom plan view of the main frame and connected parts removed from the portable frame with the platen carriage removed. It therefore will be seen that in accordance with the present invention the compacting feature really comprises three entities one of which is a complete nonfolding typewriter mechanism, another of which is the portable carrying case, and the third comprises the guiding mechanism which connects the portable case with the small typewriter.

Throughout the construction of the present typewriter machine it is necessary to provide retaining means to prevent the ends of the links, rods, etc., from becoming detached from points of anchorage and Figures 36 and 37 illustrate the preferred form of retaining device in which the end of the rod or link 719 is drilled and a suitable wire 720 is inserted through the drill opening after which the ends of the wire are bent to form arch shape members 721 and 722 which engage the sides of the rod and securely hold the wire 720 in position in its anchorage.

From the foregoing it will appear that the present machine, which is provided with a standard keyboard 723, occupies cubical contents measured as follows:—the length comprising substantially the width of the keyboard and platen length; the height being slightly more than the distance from the base of the machine frame to the top of the platen, which may be set low on the machine frame in view of the type bar action, comprising sliding type bars; and the width comprising substantially the measurement from the front of the keyboard to the back of the platen carriage. The construction and arrangement of parts is such that its cubical contents are reduced to very small dimensions while retaining the full efficiency of a commercial machine, and this is attained by constructing and arranging the parts in close compact relation when the parts are normally inactive, and then providing operating space by opening up the portable frame or case to afford clearance.

Having thus described my invention, what I claim is:

1. In a typewriting machine the combination of an end thrust bar, a base plate upon which the type bar is adapted to slide, said base plate being provided with a guiding slot of less width than the thickness of the type bar, a guiding tongue extending from said type bar into said slot, means to guide the upper edge of said type bar and means to operate said type bar for printing.

2. In a typewriting machine the combination of an end thrust type bar, a base plate upon which the type bar is adapted to slide, said base plate being provided with a slot, an operating lever extending through said slot and into operative engagement with said type bar, the operative engagement being within the space bounded by planes parallel to the type bar and spaced apart the width of the type bar, and a key lever operatively connected with said lever.

3. In a typewriting machine the combination of an end thrust type bar, an actuating lever operatively connected with said type bar, a pivot for said lever, a return spring connected to said lever and extending in the direction of said lever when the parts are in normal position with the anchorage for the spring and the connection with the lever and the pivot for the lever being angled slightly from a straight line, a key lever, and a connection between the key lever and the operating lever with the angle between said pivot and the point of connection between the operating lever and the direction of movement of the type bar being substantially ninety degrees when the parts are in normal position.

4. In a typewriting machine the combination of an end thrust type bar, an actuating lever operatively connected with said type bar, a pivot for said lever, a return spring connected to said lever and extending in the direction of said lever when the parts are in normal position with the anchorage for the spring and the connection with the lever and the pivot for the lever being angled slightly from a straight line, a key lever, and a connection between the key lever and the operating lever, said operating lever being adapted to fit over said pivot and with the forces at all times tending to maintain said pivot seated against the closed end of the slot.

5. In a typewriting machine the combination of an end thrust type bar and guides therefor comprising a top plate having projections adapted to engage the sides of the upper edge of said type bar, a supporting plate having a slot therein, guiding means for one end of the type bar extending through said slot, and operating devices to move said type bar, the point of connection between the type bar and the devices moving in the arc of a circle when the bar is moved.

6. In a typewriting machine the combination of an end thrust type bar, a supporting plate beneath said type bar, a top plate, a top pad over said top plate adapted to lessen the noise of operation of said type bar, and an end pad adapted to receive the full end thrust of said type bar on the return stroke.

7. In a typewriting machine the combination of an end thrust type bar, a supporting plate beneath said type bar, said supporting plate being provided with slots, a top plate, stationary means to guide a portion of said bar, means extending through one of said slots to guide another portion of said bar, operating devices to move said bar, the point of connection between said bar and said devices being constructed to move in the arc of a circle when the bar is operated.

8. In a typewriting machine the combination of an end thrust type bar, a supporting plate over which said type bar is adapted to slide, a top plate, guides carried by the top plate and adapted to guide the upper edge of said type bar and retain said type bar in position, means for operating said type bar comprising an operating lever and a sliding connection between said type bar and said lever, and means above the type bar for automatically lubricating the guides for said type bar and said connection.

9. In a typewriting machine the combination of a plurality of end thrust type bars a supporting plate provided with a plurality of slots converging toward the printing point, an end thrust type bar mounted for movement over each slot, a plurality of operating levers arranged upon a segmental pivot mounted beneath said supporting plate and with the upper end of an operating lever extending through each of the said slots, a machine frame carrying said supporting plate and said pivot, a plurality of key levers pivoted closely together adjacent the back of said machine frame, said key levers fanning out from said pivot toward the key board in such manner that each key lever passes directly beneath the pivot of its particular operating lever, and means connecting said key levers with said operating levers.

10. In a typewriting machine a plurality of end thrust type bars radially arranged relatively to the printing point, a plurality of operating levers mounted beneath said type bars and each lever swinging in the plane of movement of its respective type bar, and a plurality of key levers all operatively connected with said operating levers, a pivot for the rear ends of the key levers with the key levers thereon adjacent the back of the machine frame in compacted relation, and with the key levers fanning out from the pivot toward the key board, and means to guide the key levers adjacent the key board ends thereof so that the movement of each key lever is substantially directly beneath the pivot of said operating lever.

11. In a typewriting machine the combination of an end thrust type bar, an operating lever adapted to actuate said type bar, the connection between the type bar and the lever moving in the arc of a circle in a plane parallel to the movement of the bar when the bar is operated, a key lever operatively connected with said lever with the connection being arranged relatively to the pivot of the operating lever in such manner that the type bar is thrust forward by a positive accelerating speed movement and a negative accelerating power factor relatively to the speed and power of the key lever.

12. In a typewriting machine the combination of a type bar, means to operate the type bar, and lubricating means which automatically feeds lubrication to the type bar bearings by the operation of the type bar.

HARRY BATES.